(12) United States Patent
McGushion

(10) Patent No.: US 7,653,453 B2
(45) Date of Patent: Jan. 26, 2010

(54) METHOD FOR TRACKING CHARACTERISTICS IN JOINED ASSEMBLIES

(76) Inventor: Kevin David McGushion, 1446 19th St., Santa Monica, CA (US) 90405

( * ) Notice: Subject to any disclaimer, the term of this patent is extended or adjusted under 35 U.S.C. 154(b) by 160 days.

(21) Appl. No.: 11/685,738

(22) Filed: Mar. 13, 2007

(65) Prior Publication Data

US 2007/0213860 A1  Sep. 13, 2007

Related U.S. Application Data

(60) Provisional application No. 60/781,555, filed on Mar. 13, 2006.

(51) Int. Cl.
*G06F 19/00* (2006.01)
(52) U.S. Cl. .................. 700/115; 700/95; 29/428; 29/469
(58) Field of Classification Search .......... 700/95, 700/97, 98, 115, 116; 29/428–431, 469, 29/592, 791, 890.12
See application file for complete search history.

(56) References Cited

U.S. PATENT DOCUMENTS

2005/0113949 A1* 5/2005 Honda .................. 700/95

\* cited by examiner

*Primary Examiner*—Charles R Kasenge
(74) *Attorney, Agent, or Firm*—Aaron P. McGushion

(57) ABSTRACT

A method for uniquely identifying an assembly of at least two components, comprising the steps of: reading a first identifier associated with a first component; reading a second identifier associated with a second component; joining the first component to the second component with a joinder process; associating the first identifier and the second identifier with the joint, yielding a joint identification, the joint identification being recalled upon the reading of either the first identifier or the second identifier; associating the first identifier and the second identifier with the assembly, yielding an assembly identification, the assembly identification being recalled upon the reading of either the first identifier or the second identifier; storing in a machine-accessible memory the joint identification, the assembly identification, and all associations.

14 Claims, 4 Drawing Sheets

METHOD FOR TRACKING CHARACTERISTICS IN JOINED ASSEMBLIES

CROSS-REFERENCE TO RELATED APPLICATIONS

This application is entitled to the benefit of Provisional Application for Patent Ser. No. 60/781,555 filed on Mar. 13, 2006.

BACKGROUND OF THE INVENTION

The present invention relates generally to joinder manufacturing processes, and more particularly, to the unique identification and tracking of parts throughout the manufacture, assembly, end use, and disposal of the parts and resulting assembly of parts.

It is of critical importance, in modern manufacturing processes, to ensure traceability of products, and the materials and parts comprising the products. Traceability is often achieved through the use of identifiers, either generic or unique. Individual items can be traced throughout the manufacturing process, tracking quality and inventory data, as well as being used to track and respond to demand. These identifiers can also be used to identify and track parts in components assembled at a site separate from the manufacturing site, as often happens in the construction, aerospace, semiconductor, process industries, and others. Identifiers can be used by manufacturers, distributors, end users, or any other entity in the usage chain. Identifiers can be used to reference documentation, tracking serial numbers, material IDs, date codes, test data, performance information, inspection data, inventory, finance information, and numerous additional data A great many manufacturing processes use identifiers to track quality, inventory, assembly, service, and recycling of products, and the components comprising the product. Identifiers can be in the form of optical identifiers such as barcodes, inductive transmitting/receiving devices, or other form of ID memory, alpha-numeric codes, and other identification technologies presently in existence or identification technologies yet to be developed. The identification can be inscribed on the part or product, stamped, embedded, integrated, or a tag identification means can be attached. The identification means utilized being appropriate for the product type and expected usage environment.

Components originate from at least one first level manufacturer, wherein raw materials are fabricated into parts. These components may then be transported to a distributor, end user, or directly to a first assembler. The first assembler can receive components from various first level manufacturers, combining these parts into a first assembly. This first assembly can then be delivered to a second assembler. The second assembler combines the first assembly with a second assembly or series of components, creating a more complex second assembly. This process of combining components and assemblies continues until the final assembly, wherein a plurality of components and assemblies are combined in a final configuration, being ready for end use.

In more demanding fields, such as aerospace, semiconductor, and automotive, each component requires accompanying documentation throughout its lifetime, including manufacturing data, quality data, chain of custody documents, and so on. This documentation can be in paper, tag, or digital form, or a combination of the three. Conversely, in less demanding fields, this chain of documentation often stops immediately after the manufacturing process. In either case, presently, if a component possesses an identifier, the identifier is used to merely track individual components within an assembly, without tracking the unique combination of components comprising the initial and final assemblies.

Currently, when two components are joined, the joining process used is decided by the worker controlling the process, relying on experience or other references. What is lacking is a unique joining process recommendation that is automatically given to the worker, based on the unique properties of each component associated with a unique identification found on each component. For example, when welding together two components in a flow system, the worker must use past experience and intuition to create a weld schedule. All too often, information about the component, such as raw material, thickness, finish, and so on, is not known to a perfect degree, resulting in less than perfect welds.

Additionally, in present processes, information regarding the joinder processes employed at each assembly step is not controlled. For instance, presently when a first component is joined to a second component (by means of welding, adhesives, fasteners, and any other joining means), the information regarding the details of the joining process and other issues of quality are not inherently included in the documentation following the assembly, information such as the identification of the person or device that created the assembly and the exact conditions under which it was created. Not knowing the exact joining process and the strength of the bond can be catastrophic in downstream assemblies and end usage.

What is needed in the art and heretofore has not been available is a unique identification component tracking system that initially recommends a joinder process between at least two uniquely identified components, based on the known properties of each component, based on the reading of a unique identifier on each component. What is also needed is a component tracking system that, upon the joining of at least two uniquely identified components, associates each component with the resulting assembly, maintaining the complete history of each component, and forming a joinder data array. And, upon scanning any component within the assembly, the complete, exact assembly can be identified with complete information of all other components within the assembly. What is additionally needed is a tracking system that permanently stores the joinder data array within an easily accessible storage and retrieval means, the joinder data being available at any point in the lifetime of the assembly and beyond. What is yet again needed, is a tracking system that recommends maintenance and replacement of the components within a system, based on manufacturers recommendations and recalls, the replacement component being permanently associated with the assembly. The present invention satisfies these and other needs.

SUMMARY OF THE INVENTION

A method for uniquely identifying an assembly of at least two components, comprising the steps of: reading a first identifier associated with a first component; reading a second identifier associated with a second component; joining the first component to the second component with a joinder process; associating the first identifier and the second identifier with the joint, yielding a joint identification, the joint identification being recalled upon the reading of either the first identifier or the second identifier; associating the first identifier and the second identifier with the assembly, yielding an assembly identification, the assembly identification being recalled upon the reading of either the first identifier or the second identifier; storing in a machine-accessible memory the joint identification, the assembly identification, and all associations.

An alternate embodiment method for assembling at least two components, comprising the steps of: reading a first identifier associated with a first component; reading a second identifier associated with a second component, the first identifier and the second identifier referencing a machine-accessible memory containing a first data set for the first component and a second data set for the second component; determining automatically a recommended joinder process for a planned joint between the first component and the second component, the recommended joinder process being based on the combined properties of the first data set and the second data set; confirming adherence to the recommended joinder process by an assembler; joining the first component to the second component with the recommended joinder process; associating the first identifier and the second identifier with the joint, yielding a joint identification, the joint identification being recalled upon the reading of either the first identifier or the second identifier; associating the first identifier and the second identifier with the assembly, yielding an assembly identification, the assembly identification being recalled upon the reading of either the first identifier or the second identifier; storing in a machine-accessible memory the joint identification, the assembly identification, and all associations.

A method for assembling at least two components, comprising the steps of: imbedding a first generic identifier and a second generic identifier in an assembly design plan associated with a first component and a second component respectively, the first generic identifier and the second generic identifier being machine-readable, the assembly design plan detailing a joint; reading the first generic identifier and the second generic identifier associated with the assembly design plan, the first generic identifier and the second generic identifier communicating to an assembler the first component and the second component needed for the assembly, the assembly design plan and the first generic identifier and the second generic identifier being presented on a medium; communicating to the assembler a recommended joinder process for the joint; reading a first identifier associated with the first component, the first identifier including the first generic identifier; reading a second identifier associated with the second component, the second identifier including the second generic identifier; confirming adherence to said recommended joinder process by an assembler; joining the first component to the second component with a joinder process; associating the first identifier and the second identifier with the joint, yielding a joint identification, the joint identification being recalled upon the reading of either the first identifier or the second identifier; associating the first identifier and the second identifier with the assembly, yielding an assembly identification, the assembly identification being recalled upon the reading of either the first identifier or the second identifier; storing in a machine-accessible memory the joint identification, the assembly identification, and all associations.

DESCRIPTION OF THE PREFERRED EMBODIMENTS

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
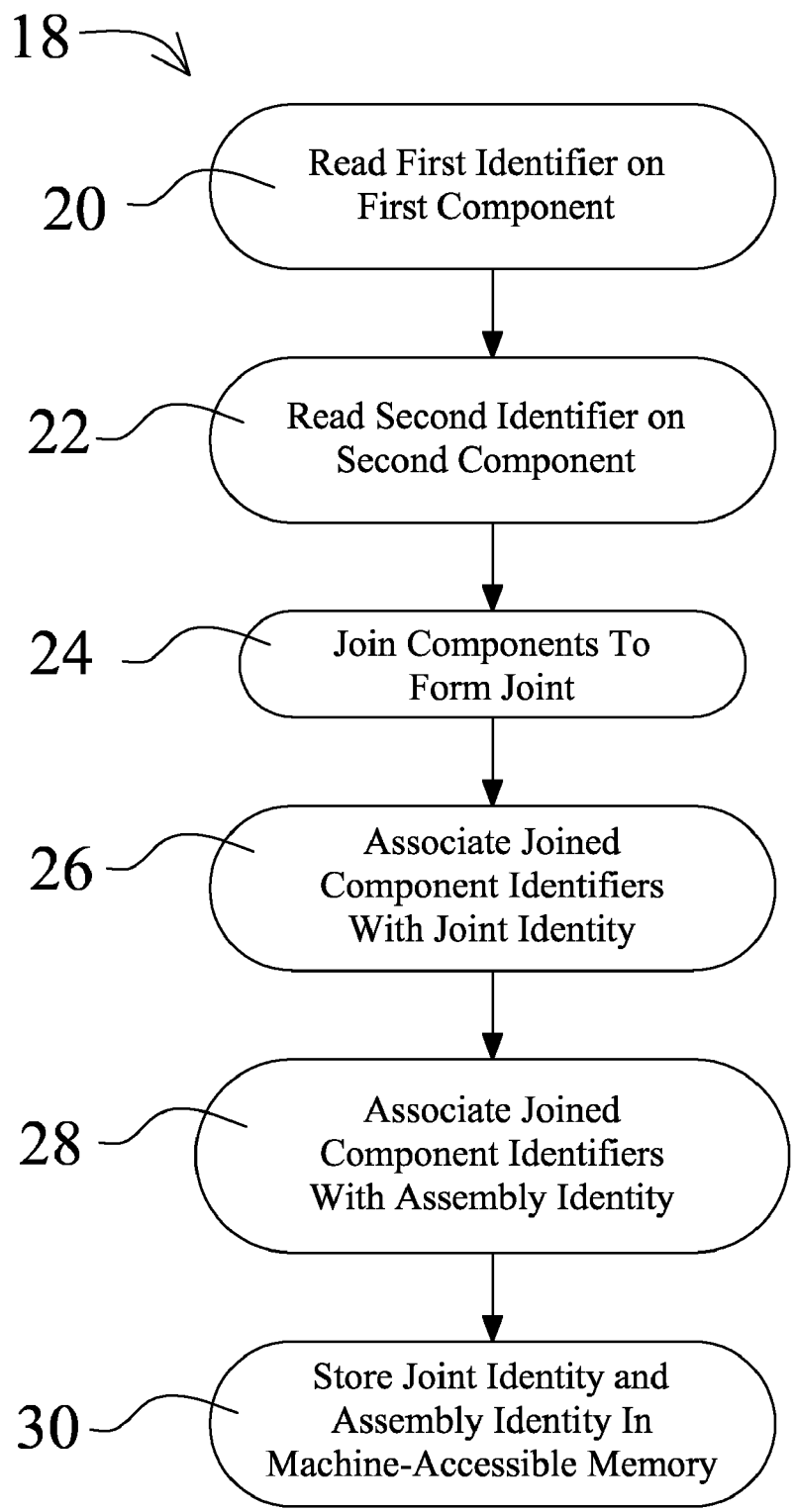
FIG. 1 is a flowchart showing a method for uniquely identifying an assembly of at least two components in accordance with a preferred embodiment of the present invention.

According to a preferred embodiment as shown in FIG. 1, the present invention provides a unique identification component tracking method 18 that tracks each component and joint within an assembly or combination of assemblies is provided. The method comprises the steps of:

a) reading a first identifier associated with a first component (step 20);

b) reading a second identifier associated with a second component (step 22);

c) joining the first component to the second component with a joinder process (step 24);

d) associating the first identifier and the second identifier with the joint, yielding a joint identification, the joint identification being recalled upon the reading of either the first identifier or the second identifier (step 26);

e) associating the first identifier and the second identifier with the assembly, yielding an assembly identification, the assembly identification being recalled upon the reading of either the first identifier or the second identifier (step 28);

f) storing in a machine-accessible memory the joint identification, the assembly identification, and all associations (step 30).

In the preferred embodiment, each component comprising an assembly is given a identifier by the manufacturer of the component or other entity. This identifier starts a quality chain, with information about the part number, material qualities, material properties, finish, batch number, manufacturing date, test data, and any other significant data, either generic to all similar components or specific to that particular component. Each component manufactured should be identified. This is achieved by instituting an identification code system, wherein each participating entity is given a sequence of codes having at least a generic portion and if preferred, a unique portion. The generic portion of the identifier identifies the component in a general manner, possibly detailing the product number, manufacturing date, batch number, material, and the like. The unique portion of the unique identifier specifically identifies the component, so it can be distinguished from all other components, similar or dissimilar, possibly detailing the serial number or other information specific to that particular component. When needed or possible, each component can have a unique portion of the identification code; this guarantees that no two components will share the same exact identity, providing a completely unique identification system.

When a plurality of components are joined in a joinder process, such as brazing, welding, fastening, gluing, and the like, the resulting junction forms a joint. To permanently record the data of this exact joint, the identifiers of each component mated at the joint are permanently associated with that joint, in effect, creating a joint identification. To permanently record the data of this exact joint, the identifiers of each component mated at the joint are permanently associated with that joint, in effect, creating an identification for that joint.

This process of joining identified components, and using the identifiers to record joint data can be continued in more complex assemblies, comprised of a plurality of components and their respective joints with contiguous or otherwise mated components.

Figure 2:
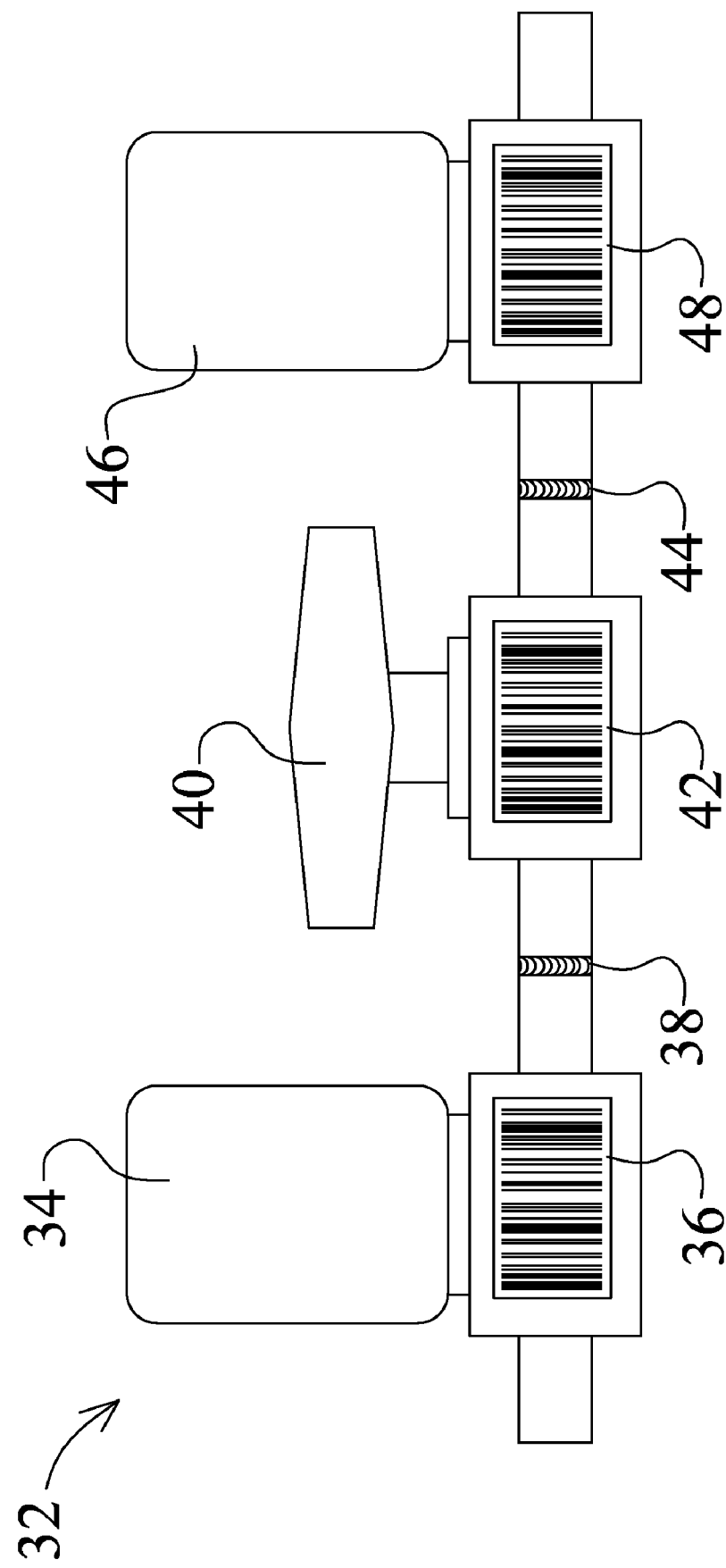
FIG. 2 is an illustration of an assembly of components created in accordance with the method of the present invention

For example, in the flow system 32 seen in FIG. 2, a first component 34 is joined to a second component 40, forming a first joint 38; and the second component 40 is, in turn, joined to a third component 46, forming a second joint 44. The first identifier 36 associated with the first component 34 and the second identifier 42 associated with the second component 40 are permanently associated with the first joint 38, the scanning of the first identifier 36 or the second identifier 42 identifying at least the first joint 38.

The identities of the second component 40 and the third component 46 are permanently associated with the second joint 44, the scanning of the second identifier 42 or the third identifier 48 identifying at least the second joint 44. Scanning the second component 40, for instance, will produce a list all of the joints associated with the second component 40, the list including the first joint 38 and the second joint 44, with all recorded information for each. Scanning any component within an assembly is sufficient to retrieve information about all components and joints within that assembly, the retrieved data showing the unique interconnected relationship of every component of the assembly and every joint in an assembly. For instance, scanning the first identifier 36 will reveal information regarding the entire assembly, including the first component 34, the second component 40, the third component 46, the first joint 38, and the second joint 44.

All of the data regarding the components and joints within an assembly can be recorded on a local computing means, a server, or an internet/intranet accessible computing means. A first data set is associated with the first identifier 38. A second data set is associated with the second identifier 42. A third data set is associated with the third identifier 48. A joint data set is associated with the first identifier 38, the second identifier 42, and the third identifier 48. An assembly data set is associated with the first identifier 38, the second identifier 42, and the third identifier 48.

Hard copies can also be stored for retrieval when needed on a paper or other appropriate medium. The storage means should be configured to deliver specific information regarding each component and joint within an assembly upon the scanning of any component within the assembly. This information should be stored for the lifetime of the assembly, and beyond if required.

Figure 3:
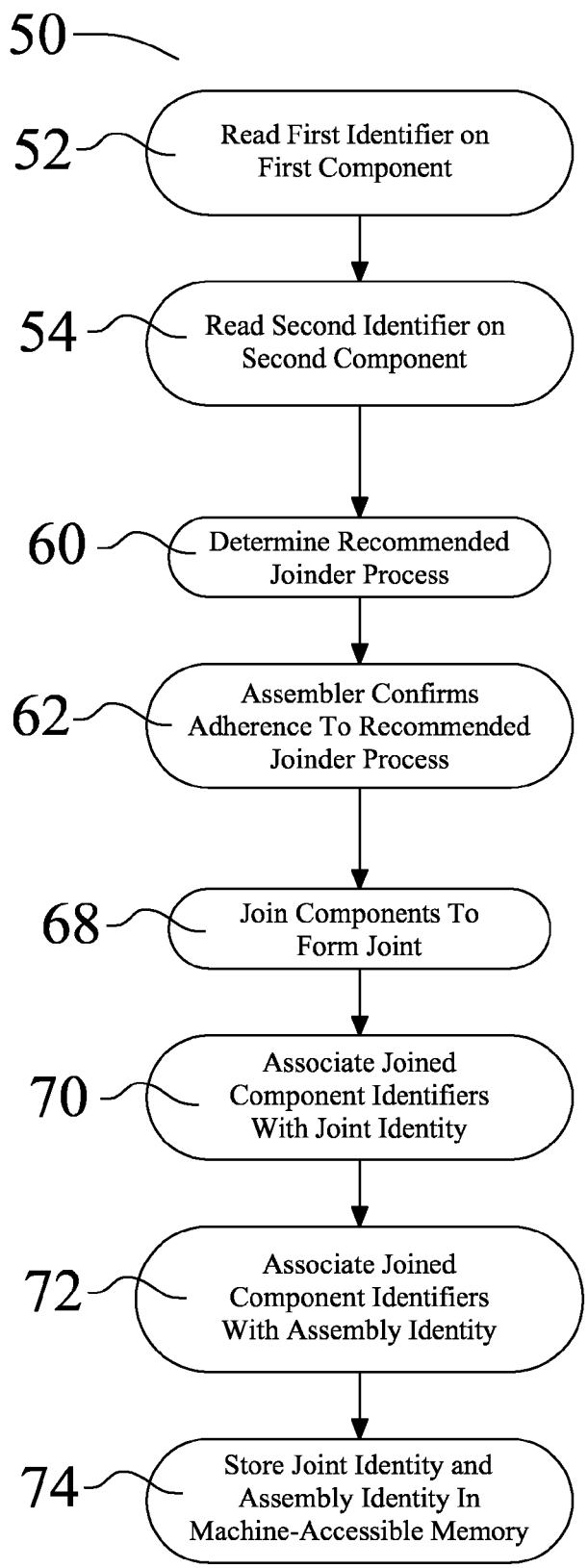
FIG. 3 is a flowchart showing a method for assembling at least two components in accordance with an alternate embodiment of the present invention.

According to an alternate embodiment as shown in FIG. 3, the present invention provides a method for assembling at least two components 50 is provided. The method comprises the steps of:
a) reading a first identifier associated with a first component (step 52);
b) reading a second identifier associated with a second component, the first identifier and the second identifier referencing a machine-accessible memory containing a first data set for the first component and a second data set for the second component (step 54);
c) determining automatically a recommended joinder process for a planned joint between the first component and the second component, the recommended joinder process being based on the combined properties of the first data set and the second data set (step 60);
d) confirming adherence to the recommended joinder process by an assembler (step 62);
e) joining said first component to said second component with said recommended joinder process (step 68);
f) associating the first identifier and the second identifier with the joint, yielding a joint identification, the joint identification being recalled upon the reading of either the first identifier or the second identifier (step 70);
g) associating the first identifier and the second identifier with the assembly, yielding an assembly identification, the assembly identification being recalled upon the reading of either the first identifier or the second identifier (step 72);
h) storing in a machine-accessible memory the joint identification, the assembly identification, and all associations (step 74).

In themselves, components have value, but no usefulness. It is only when the components are joined in intelligent combination with other components is the true usefulness and ultimate value realized. The joining process, done properly, creates a durable and useful system. If done improperly though, the negative effects can vary from niggling to catastrophic. Therefore, the significance of choosing the correct joinder process and verifying joint quality cannot be understated.

Often it is difficult for the assembler to determine the optimum joinder process for a given planned joint, between a plurality of components. In the method for assembling at least two components 50 described above, the added steps of recommending a joinder process (step 60) and confirming the adherence to the recommendation (step 62) are included. Since the identifier can include all information pertaining to each component, such as part identification, material, size, and other valuable information, each component can be identified before the joinder process (step 68) by scanning. The scanned information is inputted into a computing means and the properties of each component comprising a joint is known.

A database of known joinder processes and component joining relationships is stored on the computing means or other machine accessible means. From past experience within the industry and/or interpolated expectations, a stored joinder process between similar components is matched with the components on hand to be joined; and an ideal recommended joinder process is displayed on the computing means display means. This recommendation is conveyed to the assembler. The assembler affirms the adherence to this recommendation, then completes the joinder process, bringing together two identified components.

Figure 4:
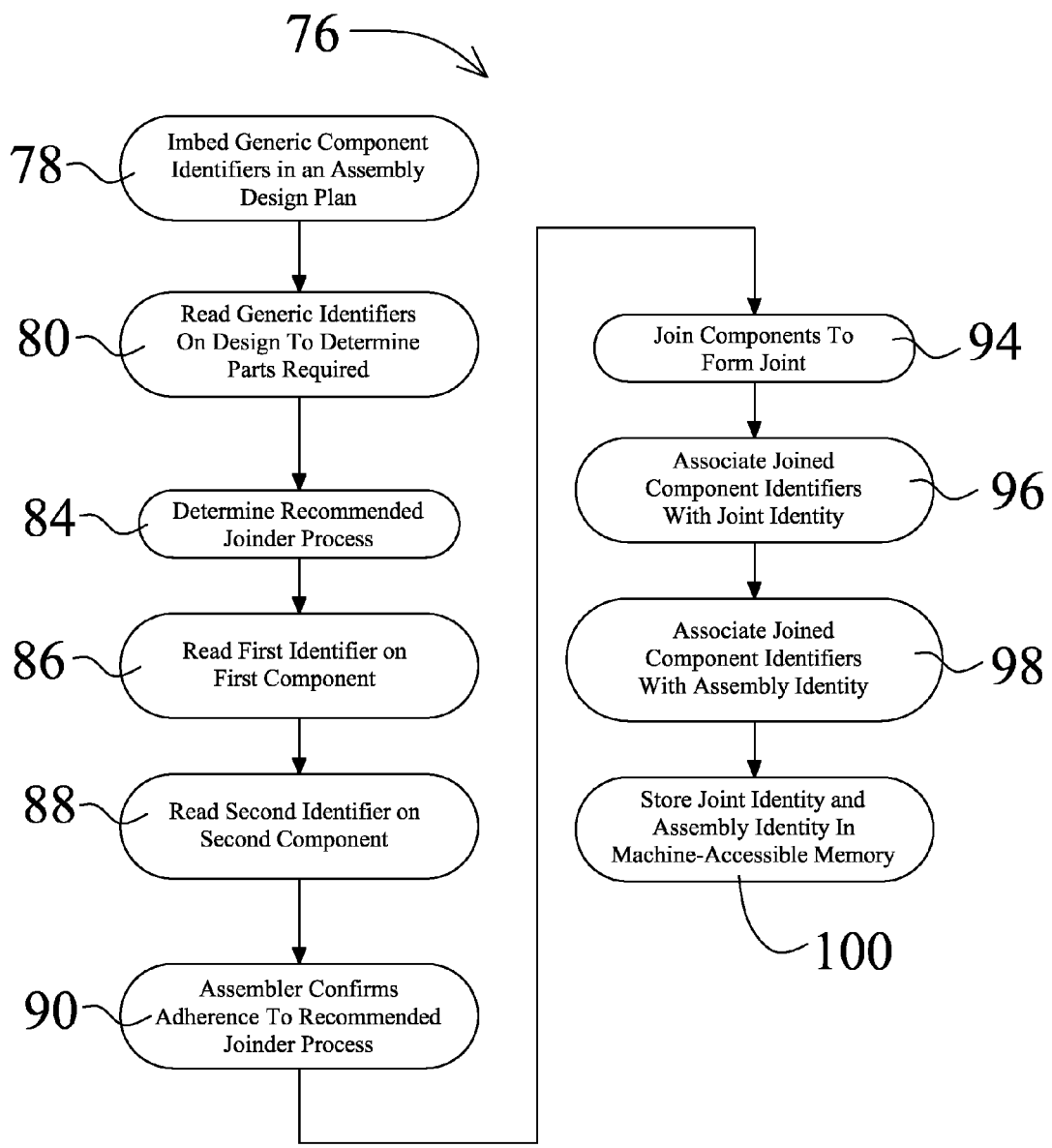
FIG. 4 is a flowchart showing a method for assembling at least two components in accordance with yet another alternate embodiment of the present invention.

According to an additional alternate embodiment as shown in FIG. 4, the present invention provides a method for assembling at least two components 76 is provided. The method comprises the steps of:
a) imbedding a first generic identifier and a second generic identifier in an assembly design plan associated with a first component and a second component respectively, the first generic identifier and the second generic identifier being machine-readable, the assembly design plan detailing a joint (step 78);
b) reading the first generic identifier and the second generic identifier associated with the assembly design plan, the first generic identifier and the second generic identifier communicating to an assembler the first component and the second component needed for the assembly, the assembly design plan and the first generic identifier and the second generic identifier being presented on a medium (step 80);

c) communicating to the assembler a recommended joinder process for the joint (step 84);

d) reading a first identifier associated with the first component, the first identifier including the first generic identifier (step 86);

e) reading a second identifier associated with the second component, the second identifier including the second generic identifier (step 88);

f) confirming adherence to said recommended joinder process by an assembler (step 90);

g) joining the first component to the second component with a joinder process (step 94);

h) associating the first identifier and the second identifier with the joint, yielding a joint identification, the joint identification being recalled upon the reading of either the first identifier or the second identifier (step 96);

i) associating the first identifier and the second identifier with the assembly, yielding an assembly identification, the assembly identification being recalled upon the reading of either the first identifier or the second identifier (step 98);

j) storing in a machine-accessible memory the joint identification, the assembly identification, and all associations (step 100).

Using this method, assemblies of components can be controlled from the initial design of the assembly, through to the actual operation. Currently, many manufacturers provide designers drawings of each component they sell, such as valves, regulators, or any other component. These drawings, or CAD blocks, can be inserted easily into a system design drawings, providing a detailed image of the fit, and overall looks and size of the component.

In addition to the CAD block with merely a drawing or model of the component, manufacturers can provide a scannable generic identifier within the CAD block, as part of the drawing. The generic identifier can communicate general information about the part, such as product type, size, finish, and other general characteristics shared between all components made with the same specifications.

In the field or assembly site, the assembler can scan a generic identifier on the drawing using a common scanning means, the name and specification of the component being displayed. The scanned components can either be ordered automatically, or manually retrieved. Upon retrieval of the specified components, the assembler can once again scan the generic identifier for a component on the drawing, then, scan the retrieved component for comparison. If the unique identifier of the component, incorporating also the generic identifier, matches the generic identifier of the drawing, the choice is verified as a match and further operations can continue.

Before an assembly is even configured to be joined, all components can be verified, and that verification becomes part of the quality chain. For instance, if there are two components in an assembly, a first component and a second component, each one is scanned, compared to the components specified in the drawing, and verified if correct. If the incorrect part is withdrawn from inventory, a warning will alert the assembler to this error, halting further operations.

After verification, an assembler can begin preparing for the joinder process. When the two unique identifiers, one on each component, are scanned, the scanning system recommends a joinder process based on the known properties and interaction between the two components. The assembler can confirm that the recommended joinder process was followed; this confirmation, along with the identity of the assembler can be recorded as part of the quality chain.

In another alternate embodiment, each component is again uniquely identified; moreover, each mating portion or joinder point of the component is generically identified. For example, a valve in a flow system may have an inlet and outlet, each being specified to be joined with a respective component. The inlet port has a scannable identifier to indicate that is in fact the inlet port. Conversely, the outlet port has a scannable identifier to indicate that is in fact the outlet port. This prevents the backwards installation of components within an assembly.

The present invention provides a method for tracking the components and their joints comprising an assembled system. This method of tracking can be used in numerous industries, including, but not limited to: food processing, automotive, pharmaceutical, aerospace, semiconductor, petrochemical, and many other industries requiring a high degree of component and joint quality tracking throughout the useful life of the part, and beyond.

The present invention further provides a method to schedule maintenance and replacement of individual components or assemblies. Scheduled maintenance may include parameters such as seal replacement or system purging for flow devices, lubrication, fluid level checks, and various other maintenance issues. Usage expectations or actual usage conditions can be entered into a computing means. The computing means can correlate the usage data to the component properties within an assembly. This correlation includes the comparing the usage to the manufacturers recommended maintenance schedule. Based on this information and various other usage specific know-how, an appropriate maintenance schedule can be created for each component, preventing undesired degradation and failure. Additionally, as parts are replaced the removed parts data are permanently associated with the assembly as a removed part, and the replacement part is newly associated to the assembly.

While the present invention has been described with regards to particular embodiments, it is recognized that additional variations of the present invention may be devised without departing from the inventive concept.

Having thus described the invention, it is now claimed:

1. A method for uniquely identifying an assembly of more than two components, comprising the steps of:
   reading a first identifier associated with a first component;
   reading a second identifier associated with a second component;
   joining said first component to said second component thereby creating a joint; and
   associating said first identifier and said second identifier with said joint, thereby creating a joint identification;
   each said component being joined to said assembly by at least one corresponding joint which is associated with a corresponding joint data; each said component having a corresponding identifier associated with a corresponding component data; the reading of any said corresponding identifier within said assembly recalling from said machine-accessible memory all data associated with said assembly, including all said corresponding joint data and said corresponding component data.

2. The method for uniquely identifying an assembly of more than two components of claim 1 Wherein said joint identification is recalled upon the reading of either said first identifier or said second identifier.

3. The method for uniquely identifying an assembly of more than two components of claim 1 further comprising the step of:
  associating said first identifier or said second identifier with said assembly, yielding an assembly identification, said assembly identification being recalled upon the reading of either said first identifier or said second identifier.

4. The method for uniquely identifying an assembly of more than two components of claim 1 wherein, at least one of said first component and said second component have a plurality of joinder points, each said joinder point having the ability to mate with a contiguous component, each said joinder point being individually identified with a joinder point identification, said joinder point identification being machine-readable; said joinder point identification identifying properties associated with said joinder point.

5. The method for uniquely identifying an assembly of more than two components of claim 1 wherein, an identifier associated with a component is a unique sequence of code, having a generic portion and having a unique portion; said generic portion sharing information with all similar components; said unique portion uniquely identifying said component.

6. A method for uniquely identifying an assembly of more than two components, comprising the steps of:
  reading a first identifier associated with a first component;
  reading a second identifier associated with a second component;
  joining said first component to said second component with a joinder process to create a joint;
  associating at least said first identifier and said second identifier with said joint, yielding a joint identification, said joint identification being recalled upon the reading of either said first identifier or said second identifier;
  associating at least said first identifier and said second identifier with said assembly, yielding an assembly identification, said assembly identification being recalled upon the reading of either said first identifier or said second identifier; and
  storing in a machine-accessible memory said joint identification, said assembly identification;
  each said component being joined to said assembly by at least one corresponding joint which is associated with a corresponding joint data; each said component having a corresponding identifier associated with a corresponding component data; the reading of any said corresponding identifier within said assembly recalling from said machine-accessible memory all data associated with said assembly, including all said corresponding joint data and said corresponding component data.

7. The method for uniquely identifying an assembly of more than two components of claim 1 wherein, said first identifier is associated with a first data set containing information specific to said first component; said second identifier is associated with a second data set containing information specific to said second component; said joint is associated with a joint data set containing information specific to said joint; a combined data set being formed comprising said first data set, said second data set, and said joint data set; said combined data set being recalled from said machine-accessible memory upon the reading of either said first identifier or said second identifier.

8. The method for uniquely identifying an assembly of more than two components of claim 1 wherein, an identifier associated with a component is a unique sequence of code, having a generic portion and having a unique portion; said generic portion sharing information with all similar components; said unique portion uniquely identifying said component.

9. A method for assembling at least two components, comprising the steps of:
  reading a first identifier associated with a first component;
  reading a second identifier associated with a second component, said first identifier and said second identifier referencing a machine-accessible memory containing a first data set for said first component and a second data set for said second component;
  determining automatically a recommended joinder process for a planned joint between said first component and said second component, said recommended joinder process being based on combined properties of said first data set and said second data set;
  confirming adherence to said recommended joinder process by an assembler;
  joining said first component to said second component with said recommended joinder process to create a joint;
  associating at least said first identifier and said second identifier with said joint, yielding a joint identification, said joint identification being recalled upon the reading of either said first identifier or said second identifier;
  associating at least said first identifier and said second identifier with said assembly, yielding an assembly identification, said assembly identification being recalled upon the reading of either said first identifier or said second identifier;
  storing in a machine-accessible memory said joint identification, said assembly identification.

10. The method for assembling at least two components of claim 9 wherein, said first data set comprises properties data associated with said first component, said second data set comprises properties data associated with said second component.

11. The method for assembling at least two components of claim 9 wherein, said assembler is uniquely identified with an assembler identification, said identifier identification being permanently associated with said joint identification and said assembly identification.

12. The method for assembling at least two components of claim 9 wherein, an adherence data set is stored in a machine-accessible memory, said adherence data set being formed by confirming adherence to said recommended joinder process, said adherence data set being permanently associated with said joint identification and said assembly identification, said adherence data set being collected by a sensor if a sensor has an ability to detect said joinder process.

13. A method for assembling an assembly of at least two components, comprising the steps of:
  imbedding a first generic identifier and a second generic identifier in an assembly design plan associated with a first component and a second component respectively, said first generic identifier and said second generic identifier being machine-readable, said assembly design plan detailing a joint;
  reading said first generic identifier and said second generic identifier associated with said assembly design plan, said first generic identifier and said second generic identifier communicating to an assembler said first component and said second component needed for said assembly, said assembly design plan and said first generic identifier and said second generic identifier being presented on a medium;
  communicating to said assembler a recommended joinder process for said joint;

reading a first identifier associated with said first component, said first identifier including said first generic identifier;

reading a second identifier associated with said second component, said second identifier including said second generic identifier;

confirming adherence to said recommended joinder process by an assembler;

joining said first component to said second component with said recommended joinder process;

associating at least said first identifier and said second identifier with said joint, yielding a joint identification, said joint identification being recalled upon the reading of either said first identifier or said second identifier;

associating at least said first identifier and said second identifier with said assembly, yielding an assembly identification, said assembly identification being recalled upon the reading of either said first identifier or said second identifier;

storing in a machine-accessible memory said joint identification, said assembly identification.

14. The method for assembling at least two components of claim 13 wherein a first computer aided drafting block for said first component includes said first generic identifier and a second computer aided drafting block for said second component includes said second generic identifier, said first computer aided drafting block and said second computer aided drafting block being inserted into said assembly design plan.

* * * * *